(12) United States Patent
Kim et al.

(10) Patent No.: US 7,671,954 B2
(45) Date of Patent: Mar. 2, 2010

(54) LIQUID CRYSTAL DISPLAY DEVICE AND METHOD FOR FABRICATING THE SAME

(75) Inventors: Jin-Ho Kim, Paju (KR); Byoung-Ho Lim, Gumi (KR); Bo-Ram Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 457 days.

(21) Appl. No.: 11/618,664

(22) Filed: Dec. 29, 2006

(65) Prior Publication Data

US 2008/0001883 A1    Jan. 3, 2008

(30) Foreign Application Priority Data

Jun. 30, 2006    (KR) .................... 10-2006-0061616

(51) Int. Cl.
*G02F 1/1343* (2006.01)
(52) U.S. Cl. ...................... 349/139; 349/187
(58) Field of Classification Search ............ 349/143, 349/141, 139, 138, 43, 106, 110, 187, 149
See application file for complete search history.

(56) References Cited

U.S. PATENT DOCUMENTS

| | | | |
|---|---|---|---|
| 6,933,528 B2 * | 8/2005 | Itakura et al. | 257/59 |
| 7,304,708 B2 * | 12/2007 | Ono et al. | 349/141 |
| 2007/0177090 A1 * | 8/2007 | Shimomaki | 349/141 |

* cited by examiner

*Primary Examiner*—Thoi V Duong
(74) *Attorney, Agent, or Firm*—Morgan Lewis & Bockius LLP

(57) ABSTRACT

A liquid crystal display (LCD) device includes an array substrate; a gate line formed on the array substrate; a data line formed on the array substrate crossing the gate lines; a thin film transistor formed on the array substrate, the thin film transistor being formed at an intersection between the gate line and the data line; a pixel electrode formed on the array substrate and connected to the thin film transistor; an insulating interlayer formed on an entire surface of the array substrate; a common electrode formed on the insulating interlayer and having a plurality of slits; a metal line formed on the insulating interlayer overlapping the data line and the common electrode; a color filter substrate attached to the array substrate; and a liquid crystal layer formed between the array substrate and the color filter substrate.

29 Claims, 3 Drawing Sheets

LIQUID CRYSTAL DISPLAY DEVICE AND METHOD FOR FABRICATING THE SAME

The present application claims the benefit of Korean Patent Application No. 10-2006-0061616, filed in Korea on Jun. 30, 2006, which is hereby incorporated by reference.

BACKGROUND OF THE INVENTION

1. Field of the Invention

The present invention relates to a liquid crystal display (LCD) device and a method for fabricating the same, and more particularly, to an in-plane switching mode LCD device.

2. Background of the Invention

Active matrix LCD devices increasingly are used for flat panel TVs, portable computers, monitors, etc. Among the active matrix LCD devices, twisted nematic (TN) type LCD devices primarily are used. In a TN type LCD device, two electrodes are respectively disposed on two substrates, and a liquid crystal (LC) director is arranged to be twisted by 90°. Then, a voltage is applied to the electrodes to drive the LC director. The TN type LCD device primarily is used because of its excellent contrast and color reproduction. However, the TN type LCD device has a narrow viewing angle.

To solve the viewing angle problems of the TN type LCD device, an IPS (in-plane switching) mode has been developed. According to the IPS mode, two electrodes, a pixel electrode and a common electrode are formed on one substrate, and an LC director is controlled by a horizontal electric field generated between the two electrodes.

The structure of a related LCD device will now be explained with reference to FIG. 1. FIG. 1 is a plane view showing an LCD device in accordance with the related art.

As shown in FIG. 1, a gate line 13 and a data line 20 are formed on a transparent substrate (not shown) of an opaque metal for defining pixels. Here, the gate line 13 and the data line 2D perpendicularly cross each other. At an intersection point between the gate line 13 and the data line 20, a thin film transistor is formed for switching a voltage ON/OFF. The thin film transistor comprises source drain electrodes 21 and 23 with an active region 19 therebetween. The gate line 13 serves as the gate of the thin film transistor.

A plate type common electrode 11 and a pixel electrode 29 formed of a transparent metal are insulated by an insulating layer, and overlap each other in a pixel region. The common electrode 11 and the common line 15 contact each other with the common line 15 parallel to the gate line 13, thereby dividing the pixel region into upper and lower parts.

The pixel electrode 29 is formed of a plate type transparent metal, and is provided with a plurality of slits 29a symmetrical to one another in the upper and lower parts with respect to the common line 15. A fringe field is generated between the common electrode 11 and the pixel electrode 29 having the plurality of slits 29a. A common signal is applied to the common electrode 11, and a pixel voltage having passed through the TFT is applied to the pixel electrode 29. A liquid crystal is driven by the fringe field. That is, when no voltage is applied to the LCD device, initially aligned liquid crystals are rotated by the fringe field, thereby permitting light to pass.

An alignment layer (not shown) is further provided at inner surfaces of upper and lower substrates of the fringe field mode LCD device. The alignment layer on the upper substrate (not shown) and the alignment layer on the lower substrate (not shown) are arranged to have an angle of 90° therebetween as in the TN mode LCD device.

A method for fabricating an LCD device in accordance with the related art will now be explained with reference to FIG. 2. FIG. 2 is a plane view showing an LCD device in accordance with the related art.

As shown in FIG. 2, a transparent conductive material, such as ITO, is deposited on an array substrate 10 and is then patterned, thereby forming a common electrode 11. Then, a metallic material is deposited on the array substrate 10 having the common electrode 11 and is then patterned, thereby forming the gate line 13 and a common line 15 (FIG. 1). Here, the gate line 13 and the common line 15 are formed parallel to each other. Also, a portion of the gate line 13 serves as the gate electrode 13a.

An insulating material is deposited on an entire surface of the array substrate 10 having the common electrode 11, the gate line 13 and the common line 15, thereby forming a gate insulating layer 17. Next, a semiconductor layer 19 is formed on the gate insulating layer 17.

A conductive material for a data line is deposited on an entire surface of the array substrate 10 having the semiconductor layer 19 and is then patterned, thereby forming data lines 20 (FIG. 1) and source/drain electrodes 21 and 23. An insulating material is deposited on the entire surface of the array substrate 10 including the data lines 20, thereby forming a passivation layer 25.

The passivation layer 25 is selectively patterned to form a contact hole exposing a portion of the drain electrode 23. A transparent conductive material, such as ITO, is deposited on the passivation layer 25 and then is patterned, thereby forming a pixel electrode 29 having a plurality of slits 29a. The pixel electrode 29 is electrically connected to the drain electrode 23 through the contact hole.

An alignment layer (not shown) is formed on the passivation layer 25 having the pixel electrode 29 and is aligned in a desired direction. In the fringe field mode LCD device, an alignment layer on an upper substrate and an alignment layer on a lower substrate are aligned to have an angle of 90° therebetween, but the alignment may be formed in any direction.

However, the related art LCD device has a number of problems. First, the common electrode is disposed below the pixel electrode, and the pixel electrode is disposed on the gate insulating layer and the passivation layer. Accordingly, light leakage is generated by an electric field formed between the source/drain electrodes and the pixel electrode in a black gradation. The light leakage is prevented by a black matrix formed on the color filter substrate. However, an alignment margin between the source/drain electrodes and the black matrix is decreased when the array substrate and the color filter substrate are attached to each other, thereby having a high possibility of a mis-alignment and decreasing the aperture ratio. Further, in the related art LCD device, a silicon nitride ($SiN_x$) is used as the passivation layer. Since the silicon nitride has a high dielectric constant of approximately 6-7, a parasitic capacitance may be generated between the common electrode and the pixel electrode.

SUMMARY OF THE INVENTION

Accordingly, the present invention is directed to a liquid crystal display (LCD) device and method for fabricating the same that substantially obviate one or more of the problems due to limitations and disadvantages of the related art.

An object of the present invention is to provide an LCD device that prevents light leakage in a black gradation, and a method for fabricating the same.

Another object of the present invention is to provide an LCD device with increased aperture ratio, and a method for fabricating the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device comprises an array substrate; a gate line formed on the array substrate; a data line formed on the array substrate crossing the gate line; a thin film transistor formed on the array substrate, the thin film transistor being formed at an intersection between the gate line and the data line; a pixel electrode formed on the array substrate and connected to the thin film transistor; an insulating interlayer formed on an entire surface of the array substrate; a common electrode formed on the insulating interlayer and having a plurality of slits; a metal line formed on the insulating interlayer overlapping the data line and the common electrode; a color filter substrate attached to the array substrate; and a liquid crystal layer formed between the array substrate and the color filter substrate.

In another aspect, a method for fabricating a liquid crystal display device comprises forming gate lines and data lines on a first substrate such that the gate lines and data lines are substantially perpendicular to each other; forming at least one thin film transistor on the first substrate, the thin film transistor being formed at an intersection of corresponding ones of the gate lines and the data lines; forming a pixel electrode connected to the thin film transistor on the first substrate; forming an insulating interlayer on an entire surface of the substrate having the gate lines, the data lines and the thin film transistor; forming a common electrode having a plurality of slits on the insulating interlayer; forming a common line overlapping the data line on the insulating interlayer; and joining the first substrate with a second substrate with a liquid crystal layer between the first and second substrates.

In another aspect, a method for fabricating a liquid crystal display device comprises forming a gate line and a data line on a first substrate, the gate line and data line crossing each other at angles of about 90° and dividing the first substrate into an image display region and a non-image display region; forming a thin film transistor on the non-image display region of the first substrate; forming a pixel electrode connected to the thin film transistor on the image-display region of the first substrate; forming an insulating interlayer on an entire surface of the substrate having the gate lines, the data lines and the thin film transistor; forming a common electrode having a plurality of slits on the insulating interlayer; forming a common line overlapping the data line on the insulating interlayer; and joining the first substrate with a second substrate with a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
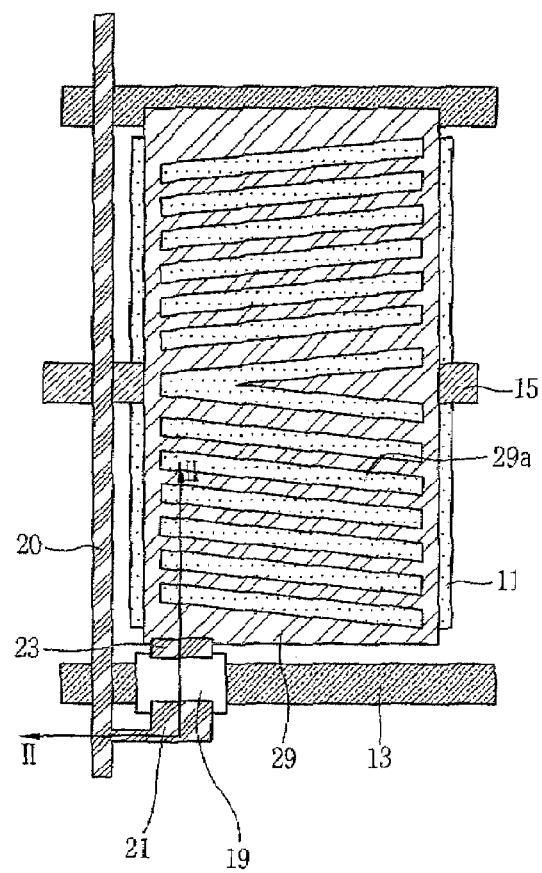
FIG. 1 is a plane view showing a liquid crystal display (LCD) device in accordance with the related art.
Figure 2:
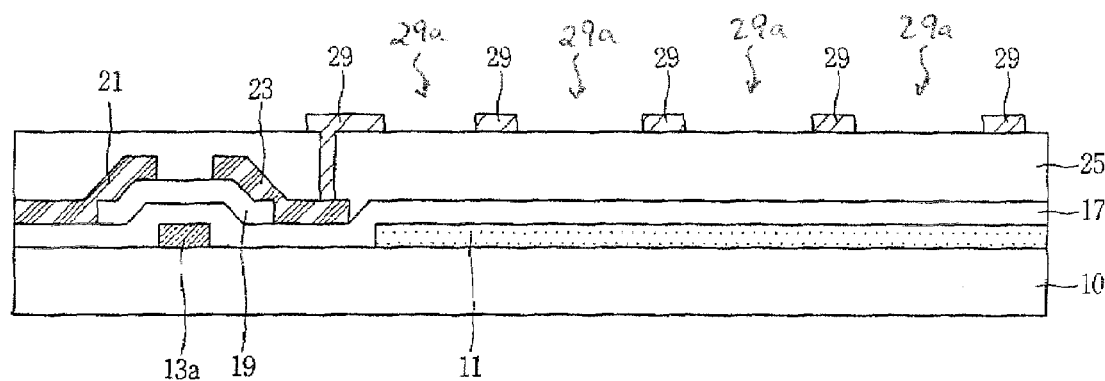
FIG. 2 is a sectional view taken along line II-II of FIG. 2.
Figure 3:
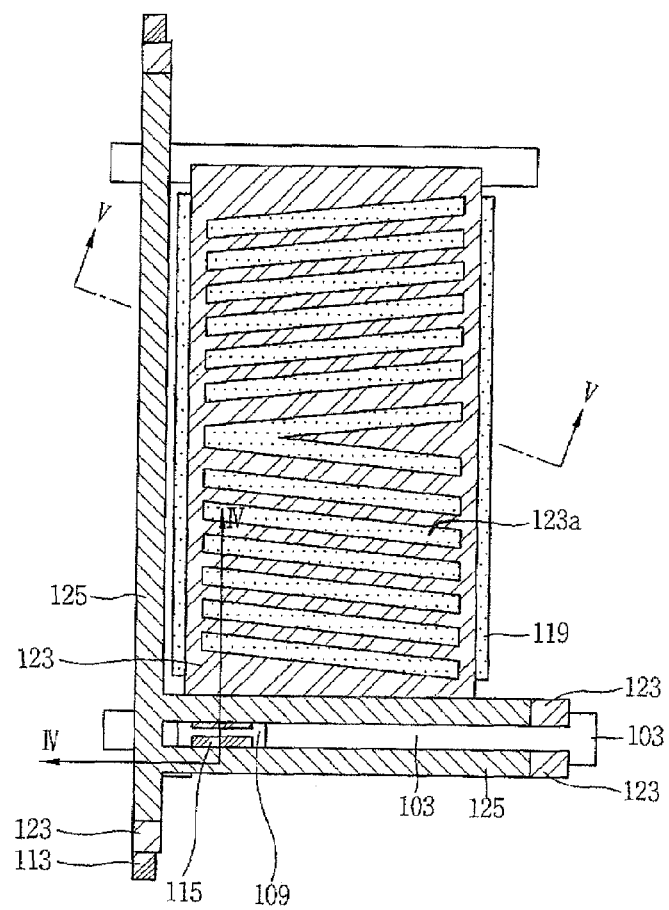
FIG. 3 is a plane view showing an exemplary LCD device according to the present invention.

Hereinafter, a liquid crystal display (LCD) device and a method for fabricating the same according to the present invention will be explained in detail. FIG. 3 is a plane view showing an LCD device according to the present invention.

As shown in FIG. 3, on an array substrate 101 (of FIG. 4), gate lines 103 and data lines 113 are respectively formed of an opaque metal and crossing one another angles of 90° for defining pixels. A thin film transistor, a plate type pixel electrode 119, and a common electrode 123 having a plurality of slits 123a are also formed on the array substrate.

The plate type pixel electrode 119 and the common electrode 123 are respectively formed of a transparent metal. The pixel electrode 119 and the common electrode 123 overlap each other in a pixel region with an insulating layer therebetween.

A perpendicular edge of the common electrode 123 is formed overlapping the data line 113. The common electrode 123 has a plurality of slits 123a symmetrical to one another in upper and lower parts. Horizontal edges of the common electrode 123 are formed to overlap sides of the gate line 103.

A fringe field is generated between the pixel electrode 119 and the common electrode 123 having the slits 123a. A common signal is applied to the common electrode 123, and a pixel voltage having passed through the TFT is applied to the pixel electrode 119. A metal line 125 formed of an opaque metal or having a small reflectivity, such as copper and molybdenum, is disposed on the common electrode 123 on the data line 113.

A liquid crystal is driven by an electric field formed between the pixel electrode 119 and the plurality of slits 123a of the common electrode 123. That is, when no voltage is applied to the LCD device, initially aligned liquid crystals are rotated by the electric field, thereby passing light.

An alignment layer (not shown) is further provided at inner surfaces of upper and lower substrates of the LCD device. The alignment layer on the upper substrate and the alignment layer on the lower substrate are arranged to have an angle of 90° therebetween like in a TN mode.

Figure 4:
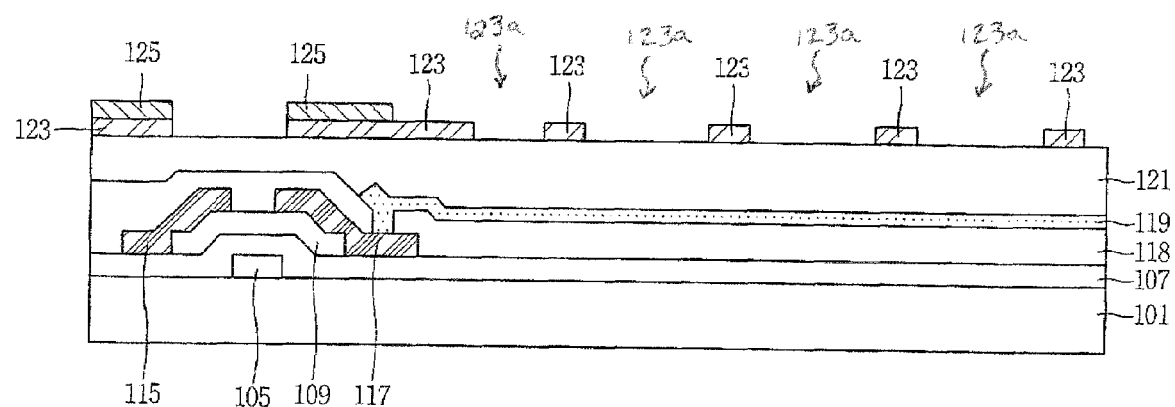
FIG. 4 is a sectional view taken along line IV-IV of FIG. 3.

A method for fabricating the LCD device according to the present invention will be explained in more detail with reference to FIGS. 4 and 5. FIG. 4 is a sectional view taken along line IV-IV of FIG. 3, and FIG. 5 is a sectional view taken along line V-V of FIG. 3.

Figure 5:
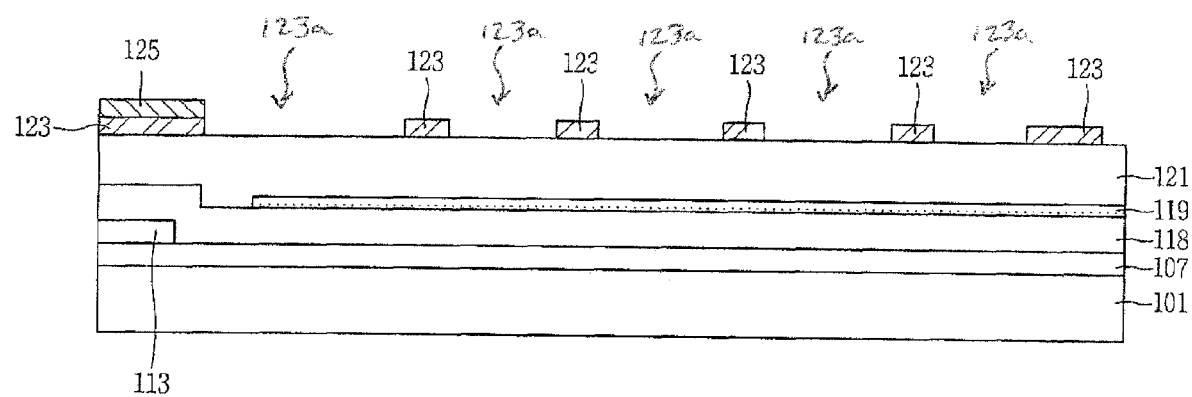
FIG. 5 is a sectional view taken along line V-V of FIG. 3.

As shown in FIGS. 4 and 5, a transparent conductive material, such as ITO, is deposited on an array substrate 101 and then is patterned, thereby forming a gate line 103 and a gate electrode 105 diverged from the gate line 103. Then, an insulating material is deposited on an entire surface of the array substrate 101 including the gate line 103 (FIG. 3), thereby forming a gate insulating layer 107. A semiconductor layer 109 is formed on the gate insulating layer 107 on the gate electrode 103. Herein, the gate insulating layer 107 is formed with a thickness of approximately 2000-5000 Å.

Next, a conductive material having a low resistance, such as copper, for forming data lines 113 is deposited on the entire surface of the substrate including the semiconductor layer 109, and is then patterned, thereby forming data lines 113 (of FIG. 3) and source/drain electrodes 115 and 117. An insulating material is deposited on the entire surface of the substrate including the data line, thereby forming a passivation layer 118. The passivation layer 118 is selectively patterned to partially expose the drain electrode 117.

A transparent conductive material, such as ITO, is deposited on the entire surface of the substrate and is then patterned, thereby forming a plate type pixel electrode 119. The pixel electrode 119 is electrically connected to the drain electrode 117. A photoacryl material is deposited on the entire surface of the substrate including the pixel electrode 119, thereby forming an insulating interlayer 121.

A transparent conductive material, such as ITO, is deposited on the insulating interlayer 121 and is then patterned, thereby forming a common electrode 123 having a plurality of slits 123a (FIG. 3). An opaque metal or a material having a small reflectivity, such as copper or molybdenum, is deposited on the entire surface of the substrate and then is patterned, thereby forming a metal line 125 on the common electrode 123. The metal line 125 overlaps the source/drain electrodes 115 and 117 including the data line 113 to define a common line.

An alignment layer (not shown) is formed on the insulating interlayer 121 including the common electrode 123 having the plurality of slits 123a (FIG. 3), thereby aligning liquid crystal material in a desired direction. In the fringe field mode LCD device, an alignment layer on an upper substrate and an alignment layer on a lower substrate have an angle of 90° therebetween. Herein, the alignment direction may be any direction. Although not shown, a black matrix and a color filter layer are formed on the upper substrate, and then the alignment layer is formed thereon. Finally, a liquid crystal layer (not shown) is formed between the upper substrate and the array substrate, thereby completing the fabrication process for an LCD device.

As discussed above, the LCD device of present invention reduces resistance of a common electrode using a metal layer as a common line formed on a region except an opening. As such, the LCD device and the method for fabricating the same according to the present invention achieve a number of advantages, examples of which will now be explained. First, since a material having a low resistance, such as copper, is used for the data lines, a capacitance between the common line and the source/drain electrodes is increased. Second, an organic insulating layer having a low dielectric constant, such as photoacryl rather than silicon nitride having a high dielectric constant, is used as the insulating interlayer. Third, an opening adjacent to the data line is widened, and the related art common line for dividing a unit pixel into two regions is removed, thereby increasing an aperture ratio. Fourth, the transparent common electrode is formed in substantially an entire open portion of the pixel region, and the common line is formed over the common electrode rather than in the open portion. Accordingly, a resistance of the common electrode can be reduced. Fifth, the common line is disposed to cover a light leakage occurrence portion due to a step between the upper common electrodes, thereby preventing a light leakage occurrence.

It will be apparent to those skilled in the art that various modifications and variations can be made in the liquid crystal display device and method for fabricating the same of the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device, comprising:
an array substrate having a plurality of pixel regions;
a gate line formed on the array substrate;
a data line formed on the array substrate crossing the gate line;
a thin film transistor formed on the array substrate, the thin film transistor being formed at an intersection between the gate line and the data line;
a pixel electrode formed on each of the pixel regions of the array substrate, and connected to the thin film transistor;
an insulating interlayer formed on an entire surface of the array substrate;
a common electrode formed on the insulating interlayer and having a plurality of slits, wherein the common electrode is formed separately on each of the pixel regions;
a metal line formed on the insulating interlayer, and overlapped with the data line and the common electrode, wherein the metal line is formed on the common electrode;
a color filter substrate attached to the array substrate; and
a liquid crystal layer formed between the array substrate and the color filter substrate.

2. The LCD device of claim 1, wherein the pixel electrode is formed of a transparent conductive material.

3. The LCD device of claim 1, wherein the insulating interlayer is formed of a photoacryl material.

4. The LCD device of claim 1, wherein the common electrode is formed of a transparent conductive material.

5. The LCD device of claim 1, wherein the metal line is formed of an opaque metal or a conductive material having a low reflectivity.

6. The LCD device of claim 1, wherein the metal line is formed overlapping the thin film transistor.

7. The LCD device of claim 1, wherein the color filter substrate includes a black matrix and a color filter layer.

8. The LCD device of claim 1, wherein the pixel electrode overlaps the common electrode.

9. The LCD device of claim 1, wherein a width of the metal line is greater than a width of the data line.

10. The LCD device of claim 1, wherein the metal line is formed on a non-image display region.

11. The LCD device of claim 1, wherein the common electrode includes a perpendicular portion and horizontal portions.

12. The LCD device of claim 11, wherein the metal line overlaps the perpendicular portion and horizontal portions of the common electrode.

13. The LCD device claim 1, wherein the metal line overlaps sides of the gate line.

14. A method for fabricating an LCD device, comprising:
forming gate lines and data lines on a plurality of pixel regions of the first substrate such that the gate lines and data lines are substantially perpendicular to each other;
forming at least one thin film transistor on the first substrate, the thin film transistor being formed at an intersection of corresponding ones of the gate lines and the data lines;

forming a pixel electrode connected to the thin film transistor on the first substrate;

forming an insulating interlayer on an entire surface of the substrate having the gate lines, the data lines and the thin film transistor;

forming a common electrode having a plurality of slits on the insulating interlayer, wherein the common electrode is formed separately on each of the pixel regions;

forming a common line on the insulating interlayer, and overlapping the data line and the common electrode, wherein the common line is formed on the common electrode; and joining the first substrate with a second substrate with a liquid crystal layer between the first substrate and the second substrate.

15. The method of claim 14, wherein the pixel electrode is formed of a transparent material such as an ITO.

16. The method of claim 15, further comprising forming a black matrix and a color filter layer on the second substrate.

17. The method of claim 14, wherein the insulating interlayer is formed of a photoacryl material.

18. The method of claim 14, wherein the common electrode is formed of a transparent material.

19. The method of claim 14, wherein the common line is formed of an opaque metal, or a conductive material having a low reflectivity.

20. The method of claim 14, wherein the common line is formed overlapping the thin film transistor.

21. The method of claim 14, wherein a width of the common line is greater that a width of the data line.

22. The method of claim 14, wherein the common line is formed on a non-image display region.

23. The method of claim 14, wherein the common electrode includes a perpendicular portion and horizontal portions.

24. The method of claim 23, wherein the common line overlaps the perpendicular portion and horizontal portions of the common electrode.

25. The method of claim 14, wherein the common line overlaps sides of the gate line.

26. A method for fabricating an LCD device, comprising:

forming a gate line and a data line on a plurality of pixel regions of a first substrate, the gate line and data line crossing each other at angles of about 90° and dividing the first substrate into an image display region and a non-image display region;

forming a thin film transistor on the non-image display region of the first substrate;

forming a pixel electrode connected to the thin film transistor on the image-display region of the first substrate;

forming an insulating interlayer on an entire surface of the substrate having the gate line, the data line and the thin film transistor;

forming a common electrode overlapping the data line on the insulating interlayer, wherein the common electrode is formed separately on each of the pixel regions;

forming a common line overlapped with the data line and common electrode on the insulating interlayer, wherein the common line is formed on the common electrode; and joining the first substrate with a second substrate with a liquid crystal layer between the first and the second substrates.

27. The method of claim 26, wherein the common electrode includes a perpendicular portion and horizontal portions.

28. The method of claim 27, wherein the common line overlaps the perpendicular portion and horizontal portions of the common electrode.

29. The method of claim 26, wherein the common line overlaps sides of the gate line.

* * * * *